United States Patent [19]

Komplin et al.

[11] Patent Number: 5,002,375
[45] Date of Patent: Mar. 26, 1991

[54] VARIABLE PEL DENSITY PRINT HEAD FOR ELECTROPHOTOGRAPHIC PRINTERS

[75] Inventors: Steven R. Komplin, Lexington, Ky.; Ravinder Prakash, Concord, N.C.; Larry L. Wolfe, Broomfield, Colo.

[73] Assignee: International Business Machines Corporation, Armonk, N.Y.

[21] Appl. No.: 492,027

[22] Filed: Mar. 12, 1990

[51] Int. Cl.$^5$ .......................... G02B 17/00; G02B 5/04
[52] U.S. Cl. ....................................... 350/447; 350/286
[58] Field of Search ............... 350/447, 415, 432, 168, 350/174, 286–287, 112, 424

[56] References Cited

U.S. PATENT DOCUMENTS 4,892,371 1/1990 Yamada et al. ...................... 350/174

Primary Examiner—Bruce Y. Arnold
Assistant Examiner—James Phan
Attorney, Agent, or Firm—J. R. Hanway

[57] ABSTRACT

In a laser printer, light beams need to be focused onto a printing surface to form points where print indicia are to effect a print image. In a printer where it is desirable to have variable pitch print characters, a new method has been employed to create variable print character pitches. Multiple non-parallel points of light are emitted through a collimating lens onto a wedge shaped optical component which directs the multiple beams of light into parallel alignment. The optical wedge has one planar surface perpendicular to at least one light beam emitted through the collimating lens. This light beam is normal to the perpendicular planar surface and passes through the wedge without being deflected. The optical wedge also has one or more planar surfaces that direct the other light beams into parallel alignment with the undeflected light beam. By moving the optical wedge away from the collimating lens the pitch (distance) between the light beams is increased and conversely, by moving the optical wedge towards the collimating lens the pitch decreases.

11 Claims, 5 Drawing Sheets

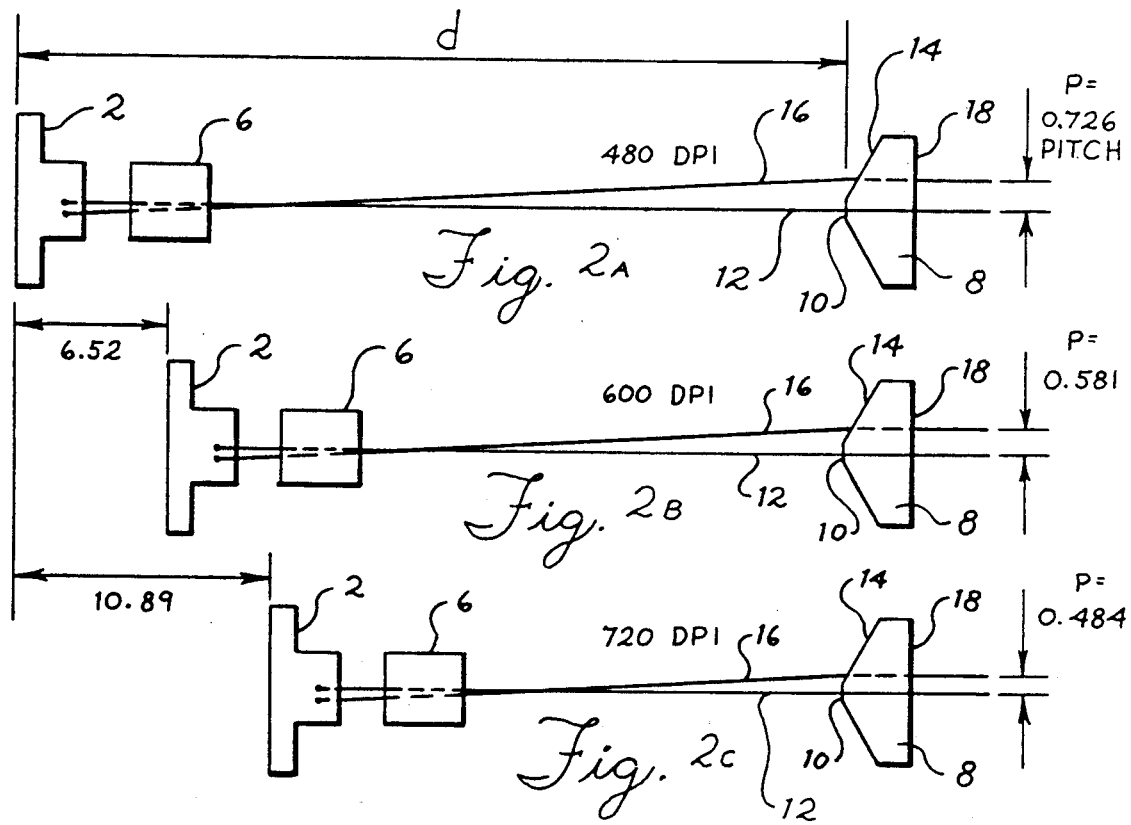
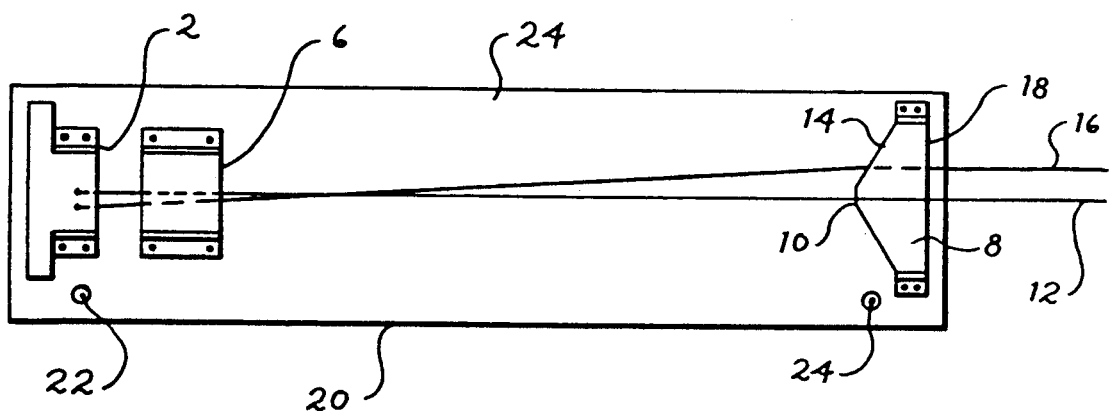

VARIABLE PEL DENSITY PRINT HEAD FOR ELECTROPHOTOGRAPHIC PRINTERS

BACKGROUND OF THE INVENTION

1. Field of the Invention

This invention relates to an optical system in which two or more nonparallel light beams are directed by an optical wedge into parallel light beams onto a photosensitive surface, resulting in a system which allows the adjustment in indicia pitch on the photosensitive medium by adjusting the optical wedge position in relationship to the light source. An application of this invention is in the construction of print heads for laser printers.

2. Related Art

In laser printers a light source is generated and through reflective surfaces is directed onto a photosensitive surface which in turn is the vehicle for fixing indicia on a permanent print medium. Various light sources have been employed including semiconductor light beam arrays. These light beams have been collimated and directed onto mirror surfaces which have been configured to reflect the light beams onto the photosensitive medium. In these systems, beam size has been controlled by lens arrangements, which results in indica pitch being fixed as well.

One system for varying the diameter of a beam spot is disclosed in U.S. Pat. No. 4,353,716 Tokumitsu et al. in which the light beam width is regulated by an afocal zoom lens. This lens systems is comprised of multiple lens elements. It teaches emitting light beams to a collimator where the beams are made parallel and then emitted to an afocal multi-lens zoom lens where the diameter of the light beam is adjusted by regulating the distance between lens elements of the afocal lens. The shape of the light beam is also regulated by lens configuration, where an elliptical cross-section beam is shaped to a circular cross-section configuration.

A multibeam scanning apparatus capable of changing magnification is disclosed in U.S. Pat. No. 4,390,235, Minoura, in which a light source generates a plural number of collimated light beams and an afocal zoom lens is used for changing the angular magnification of the collimated light beams from the light source directed onto a first anamorphic optical system which focuses the light beams onto a reflective surface normal to the light beams which in turn directs light beams to a second anamorphic optical system between the reflective surface and a surface to be scanned. Afocal zoom lenses are used to vary beam diameter in this patent.

Also shown in Japanese patent No. 60-57818, *Beam Expander for Laser Light*, with inventor Nobuyuki Baba, is a laser light beam which is expanded by use of convex lens.

The previous recited patents all teach regulating light beam width by use of lens systems, principally complex afocal lens with multiple lens. None of these patents teach regulating indicia pitch by aligning multiple, non-parallel light beams into parallel light beams with variable pitches through a simple optical system.

SUMMARY OF THE INVENTION

Accordingly, it is an object of this invention to provide a simplified optical system for varying the pitch of print indicia onto a medium from multiple light beam source in a laser printer.

It is yet another object of this invention to provide an optical system for taking non-parallel multiple light beams and directing them into parallel alignment through a simplified optical system.

And it is yet another object of this invention to provide an optical system with a simplified structure to take non-parallel light beams and direct them into parallel alignment and by adjusting the position of the components of the system to adjust the pitch of the resulting parallel light beams.

All of these objectives are accomplished by the use of a simple arrangement using a multiple light beam source such as a semiconductor laser emitter to radiate light beams and a collimating lens to collimate these non-parallel light beams and an optical wedge to direct these non-parallel light beams into parallel alignment. By moving the optical wedge along an axis normal to the collimating lens focal plane, the pitch of the light beams passing through the optical wedge into parallel alignment is varied. As a result, the pitch of the print indicia onto a photosensitive medium can be varied by mechanically adjusting the position of the optical wedge in relationship to the collimating lens. Using this invention, a laser printer with a variable pitch printer feature can be manufactured inexpensively, as well as other optical systems which can employ an optical wedge, to vary the spacing between parallel light beams.

BRIEF DESCRIPTION OF THE DRAWINGS

FIGS. 2A,B&C shows the variation in pitch of parallel light beams with the optical wedge at different positions in relationship to the collimating lens and light source.

FIG. 3 shows an optical wedge in fixed relationship to a collimating lens and a light source.

DESCRIPTION OF THE PREFERRED EMBODIMENT

Figure 1:
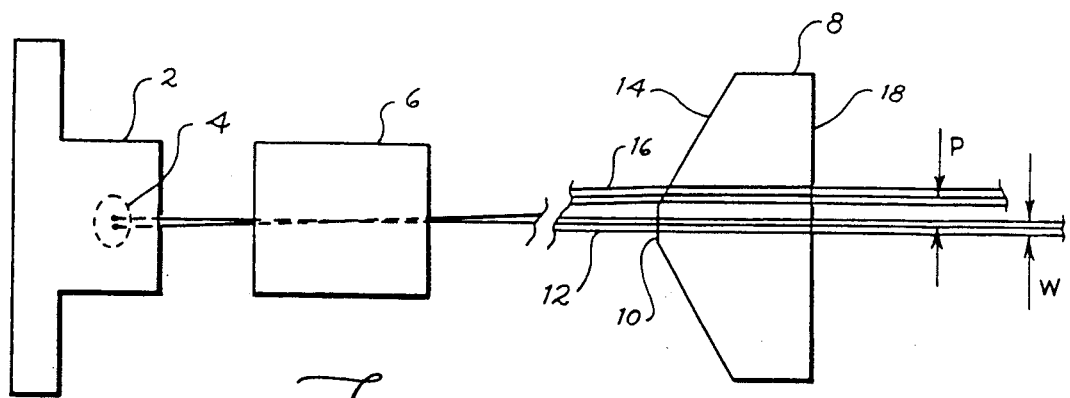
FIG. 1 is a representation of an optical wedge in relationship to a collimating lens and a light source.

Referring to FIG. 1, an optical system is shown for producing a variable pel density on a printer using light beams to create print indicia. The optical system shown is a representation of a print head employing a multiple light beam source 2, such as a semiconductor laser emitter, which emits two light beams 4. The two light beams 4 are directed to a collimating lens 6, which in this instance is a graded index lens manufactured by Nippon Sheet Glass. Other suitable collimating lens may be used as well. The two light beams 4, emitted from the collimating lens 6, exit the collimating lens 6 non-parallel and each one strikes an optical wedge 8 at separate planar surfaces. A first planar surface 10 of optical wedge 8 is normal to the axis of the path of one of the non-parallel light beams 12 and a second planar surface 14 on optical wedge 8 is inclined from the first planar surface 10, by an angle of less than 90 degrees, to an angle which directs the light beam 16 striking it into parallel alignment with the light beam 12 striking planar surface 10. By way of example, the width "W" of light beam 10 is 700 um, which is approximately the same size as light beam 16 after it passes through optical wedge 8. In this FIG. 1, the distance "P" denotes pitch which is the measurement between the center lines of light beams 12 and 16 as they emerge from the back planar surface 18 of optical wedge 8.

Figure 1A:
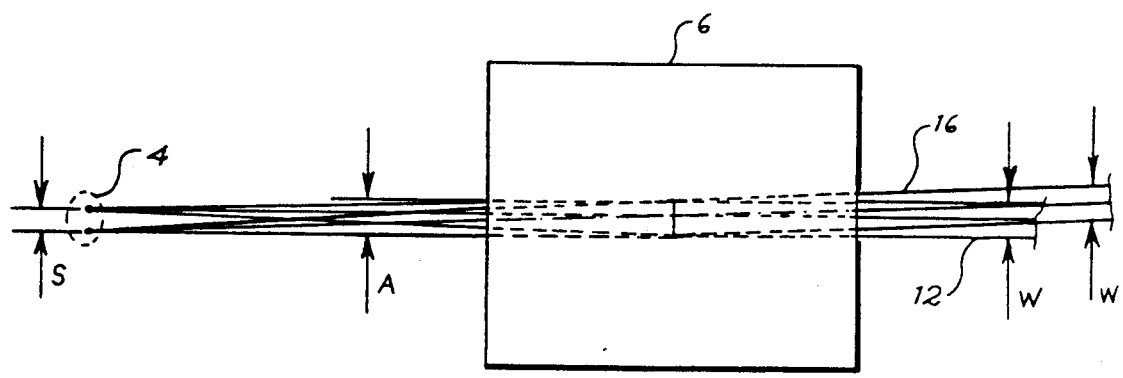
FIG. 1A is a representation of two light beams passing through a collimating lens.

FIG. 1A, is a detail diagram of the light beams 12 and 16 passing through collimating lens 6 as they are emitted from multiple light source 2. In this figure, by way of reference, there is shown the spacing "S" which represents the laser cavity separation of the multiple light source 2 and aperture "A" for the collimating lens 6. As the light beams 12 and 16 pass through the collimating lens 6, the light beams 12 and 16 are given the beam width "W". It is anticipated that aperture "A" will be varied, on collimating lens 6, to control the beam width "W" to make it more or less uniform as the pitch "P" is varied, as will later be described.

Figure 1B:
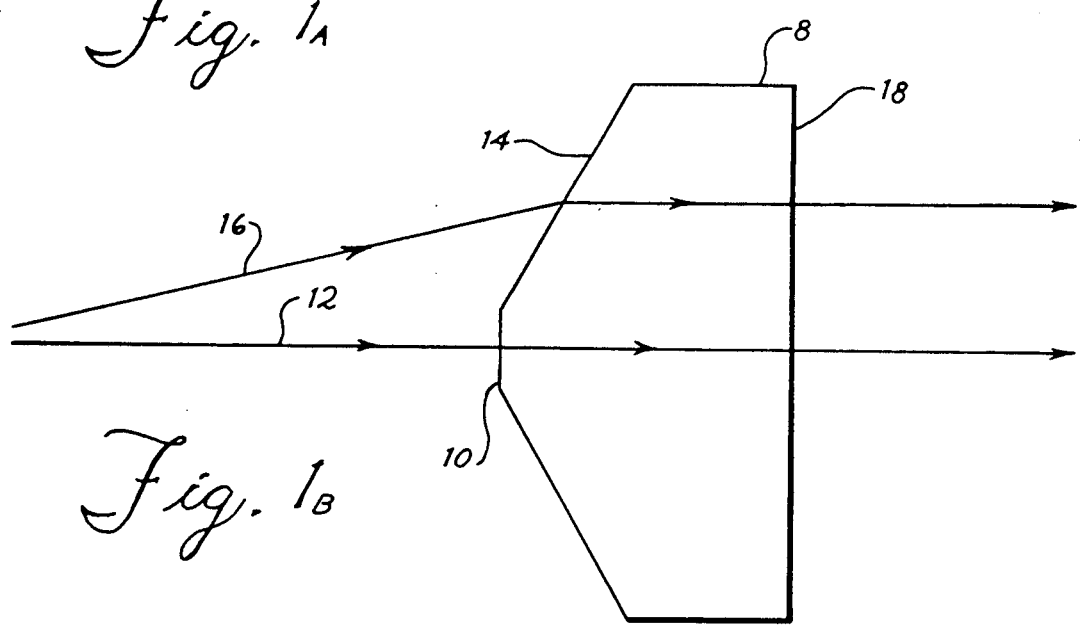
FIG. 1B shows an optical wedge with light beams directed through it.

Optical wedges are normally made of glass, but may be made of other refractive material, and consist of at least two non-parallel glass surfaces to direct light beams striking at least one of the surfaces. Shown in FIG. 1B is a blow-up detail of optical wedge 8 in which light beam 16, strikes the second planar surface 14 set at an angle of less than 90 degrees to first planar surface 10. As light beam 16 strikes planar surface 14, the light beam 16 is directed into parallel alignment with light beam 12 as it exits the back planar surface 18 of optical wedge 8 which directs the now parallel light beams 12 and 16 onto a photosensitive medium, or other surface, not shown. Light beam 16 normally exits back planar surface 18 undeflected and in parallel alignment with light beam 12. However, optical wedge 8 will also perform the function of parallel beam alignment if light beams 16 and 12 strike back planar surface 18 at an angle.

Figure 1C:
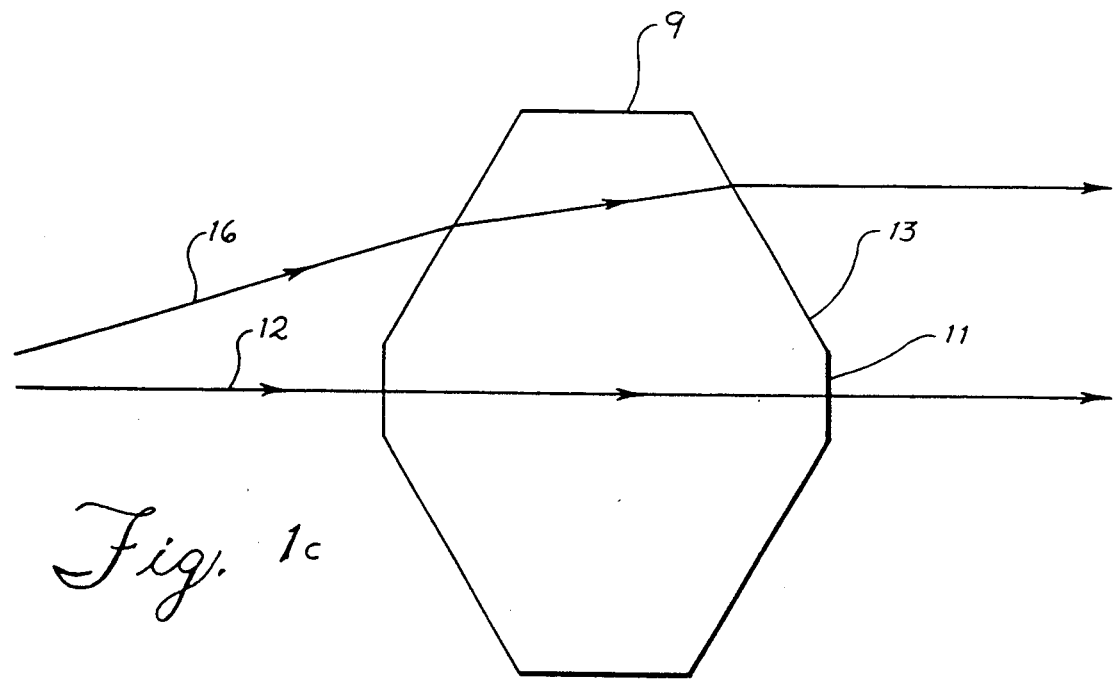
FIG. 1C shows an optical wedge with angled facets on both sides, with light beams directed through it.

An alternate configuration for an optical wedge 9 is shown in FIG. 1C. In this embodiment, the first and second planar surfaces, or facets, 10 and 14 respectively, have essentially mirror planar surfaces 11 and 13 on the reverse side of optical wedge 9, to demonstrate that a variety of optical wedge configurations may be employed so long as the optical wedges geometry takes non-parallel light beams, and through known optical principles, directs light beams into parallel alignment.

Figure 1D:
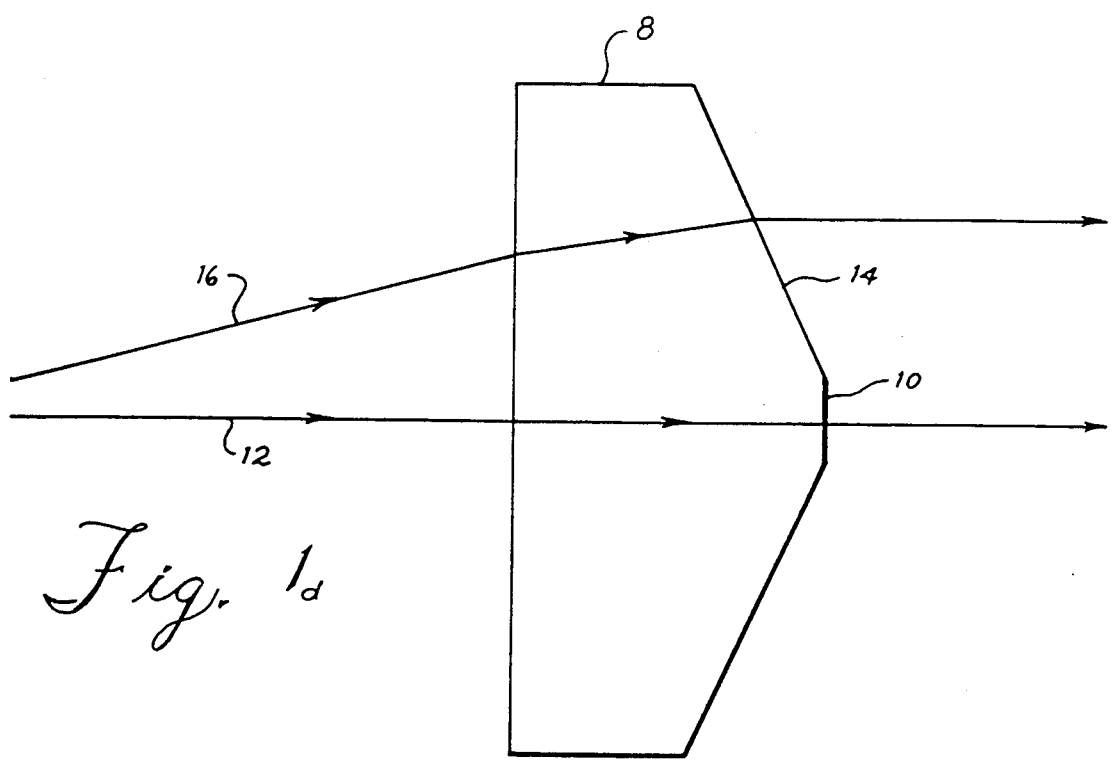
FIG. 1D shows an optical wedge, reversed in the optical pathway, from the position shown in FIG. 1B, so that light beams first strike a single planar surface.

A further embodiment is shown in FIG. 1d, in which the optical wedge 8 is reversed in the optical pathway of non-parallel light beams 12 and 16, so that these light beams now first strike the back planar surface 18, as shown in FIG. 1B. In effect, the optical wedge is rotated 180° in the optical pathway. The optical wedge 8, in this reversed position, also redirects the non-parallel light beams 12 and 16 into parallel alignment by being redirected by planar surfaces 10 and 14 into parallel alignment. Planar surfaces 10 and 14, intersect at an angle of less than 90°, to achieve the described function.

Light beams 12 and 16 as shown in FIGS. 2A,B&C are directed into different pitches "P" as a relationship of "d", which is defined as the distance between a fixed point on the multiple light beam source 2, which in this instance is a laser array, and the first planar surface 10 on optical wedge 8. As shown in FIG. 2A, where the distance d is greatest, the resulting Pitch is 0.726 mm, leading to 480 dots per inch. In FIG. 2B, d is reduced by 6.52 mm and the resulting Pitch is 0.581 mm, leading to 600 dots per inch. And in FIG. 2C, the distance d is reduced by 10.89 mm from that shown in FIG. 2A resulting in a Pitch of 0.484, leading to 720 dots per inch. In a print head for laser printers using this optical arrangement, the pel density may be varied by changing the distance d. The resulting variation in pel density is useful in situations where there is a need to have interlaced scans of a print image, to adjust the print character pel accordingly.

In FIG. 3 there is shown a print head arrangement in which the components consisting of a multiple light beam source 2, a collimating lens 6 and optical wedge 8 are fixed into relationship to one another on a print head fixture 20. By so fixing the components 2, 6 an 8 in a fixed relationship on print head fixture 20, a selected pitch may be set and the print head optical unit 24 may be manufactured for mounting into a printer, not shown, by mounting means through mounting holes 22 and 24, which are shown for representation purposes of how mounting means may be employed.

Figure 4:
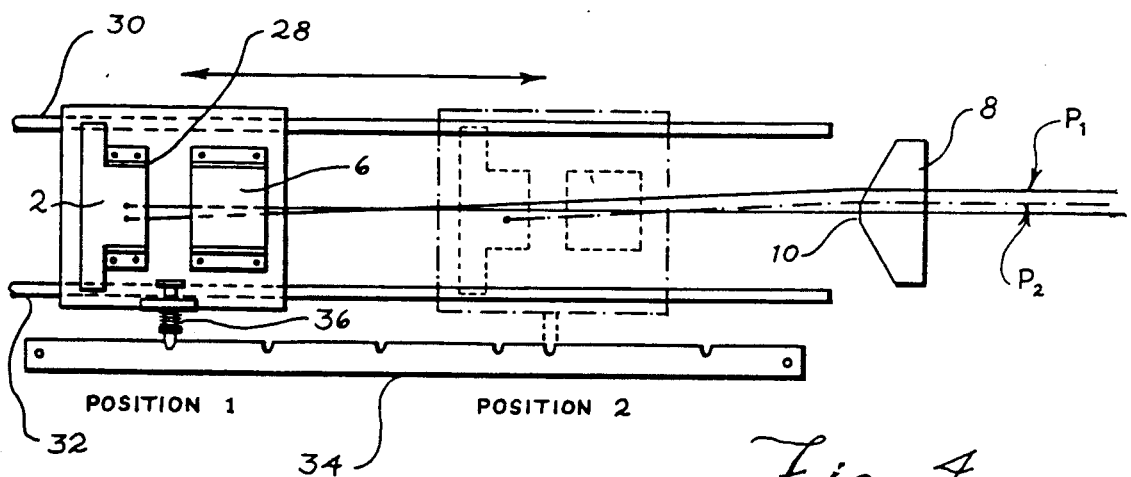
FIG. 4 shows an optical system with a light source and collimating lens in fixed relationship one to another and movable into preset fixed positions in relationship to an optical wedge.
Figure 5:
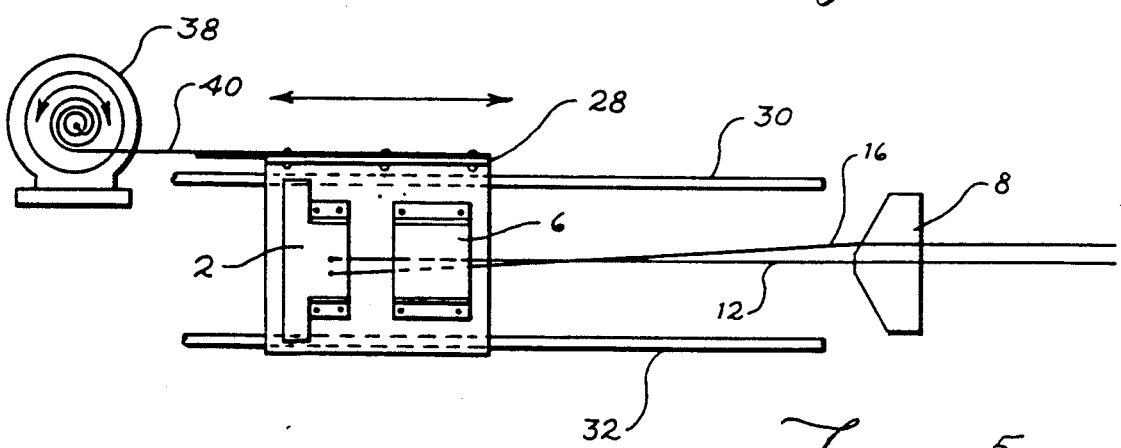
FIG. 5 shows an optical system with a light source and collimating lens in fixed relationship one to another and movable in relationship to a optical wedge by a motor.

The optical system of this invention may also be manufactured to have movable components so that the pel density, which is defined by Pitch "P", may be adjusted after the printer has been assembled. Shown in FIGS. 4 and 5 are two representations of how such an adjustable assembly may be constructed. Shown in FIG. 4 is a manually adjustable system in which multiple light beam source 2 and collimating lens 6 are mounted on a frame 28, in fixed relationship to one another. Frame 28 is in turn slidably mounted on rails 30 and 32 so that the frame 28 may slide along an axis which is normal to the first planar surface 10 of optical wedge 8. Parallel to rail 32 there runs a bar 34, with indentations. Mounted on Frame 28 is a spring biased detent 36 which is aligned to engage recesses in bar 36 which are set at predetermined locations. It can be seen that by moving the frame 28 from position 1 to position 2, the Pitch can be adjusted from $P_1$ to $P_2$. In effect, the closer that frame 28 is moved to optical wedge 8, the smaller is the resulting pitch "P". By preselecting the recesses in bar 34, the preset pitches may be determined which allows printers to be assembled which can have their pitches adjusted after manufacturing, including by the user. Mechanical means may be used in a printer to move the frame 28 to various preset positions by a user, corresponding to definite pitches.

FIG. 5 shows an arrangement for adjusting pitch "P" by using a stepping motor to adjust the position of frame 28 in an assembly essentially the same as recited in FIG. 4. The use of a stepper motor with known logic means to determine precise positioning of the motor winding allows a spring connector 40 attached to the stepper motor 38 winding to accurately position frame 28 in relationship to optical wedge 8 to thereby adjust the pitch "P".

Figure 6:
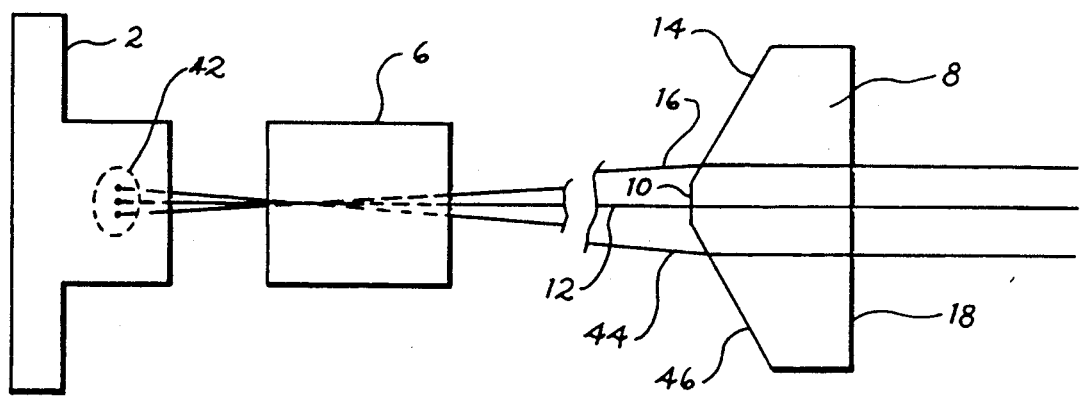
FIG. 6 shows an optical system constructed according to the invention using a three-beam light source.

The invention disclosed so far has spoken only of two light beams directed into parallel alignment by means of an optical wedge. More than two light beams may be thus directed into parallel alignment where an optical wedge is constructed with appropriately aligned planar surface for each non-parallel light beam incident to it. By way of example there is shown in FIG. 6, a variable pel print head having a multiple light beam source 42 emitting three non-parallel light beams 12, 16 and 44 through collimating lens 6 and directed to optical wedge 8. Light beams 12 and 16 strike optical wedge 8 at the first planar surface 10 and the second planar surface 14 respectively, and light beam 44 strikes the third planar surface 46 of optical wedge 8 which directs light beam 44 into parallel alignment with light beams 12 and 16 as they exit optical wedge 8 at its back planar surface 18. The third planar surface 46 is in this case a mirror image of the second planar surface 14. It is clear that multiple planar surfaces on optical wedge 8 may be constructed to accommodate as many light beams as are directed to optical wedge 8 by collimating lens 6.

Figure 7:
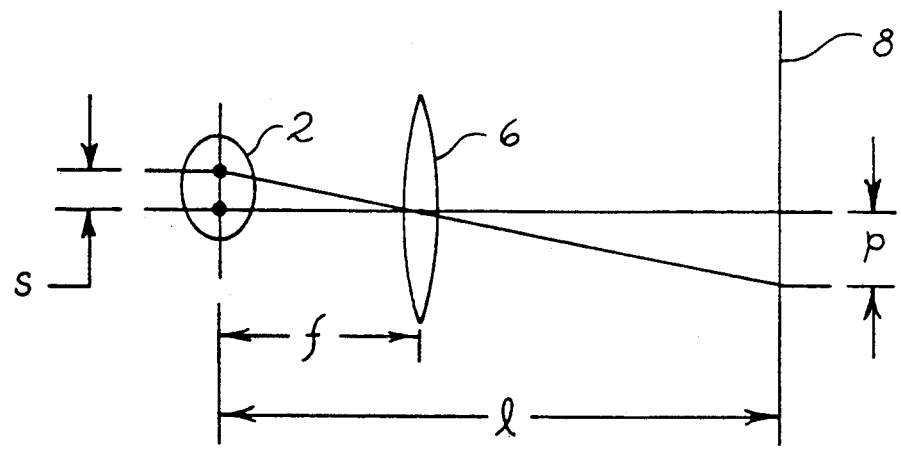
FIG. 7 shows the diagramatic relationship of a print head, collimating lens, optical wedge and multiple light beam source.

To further help define the optical relationship of the print head, the collimating lens 6, optical wedge 8, and the multiple light beam source 2, which is a laser array in this application of the invention, is shown in diagramatic relationship in FIG. 7. The various parameters are set forth to define the variables in an equation which expresses "P" Pitch as a function of the laser cavity separation of the light sources "s", the focal length of the collimating lens 6 in relationship to the laser array 2 defined as "f" and the distance between the laser array 2 and the first planar surface 10 of the optical wedge 8 is defined as "l". According to the parameters, the equation is: $P = S \times (l-f)/f$. By solving for the variables in this equation the correct pitch may be determined or the correct spacing of components for a desired pitch may be determined.

It will be apparent to those skilled in the art of optics and laser printers that the use of an optical wedge to align non-parallel sources of light into parallel light beams has applications beyond the embodiments described and it will also be apparent to one skilled in the art that various changes may be made in the structure and method set forth for providing for variable pel density print head without departing from the spirit and scope of the invention.

We claim:

1. An optical wedge for directing non-parallel beams of light into parallel beams, comprising:
    a first planar surface in the optical pathway of a first beam of light of said non-parallel beams of light, and
    a plurality of planar surfaces set at angles to said first planar surface for directing multiple non-parallel beams into parallel alignment with said first beam and with one another.

2. An apparatus for producing parallel light beams on a surface from multiple light points, comprising:
    means for producing and emitting multiple light beams,
    means for collimating said multiple light beams, and
    an optical wedge, having a first planar surface in the optical pathway of at least one of the collimated light beams, and multiple planar surfaces intersecting said first planar surface at angles to direct collimated light beams striking each of said multiple planar surfaces into parallel alignment with a collimated light beam striking said first planar surface.

3. An apparatus for producing parallel light beams with variable pitch from multiple non-parallel light beams, comprising:
    means for producing and emitting multiple non-parallel light beams,
    means for collimating the non-parallel light beams emitted from said means for producing and emitting multiple non-parallel light beams,
    an optical wedge, having a first planar surface in the optical pathway of at least one of the collimated light beams, and multiple planar surfaces intersecting said first planar surface at angles to direct collimated light beams striking each of said multiple planar surfaces into parallel alignment with a collimated light beam striking said first planar surface, and
    means to adjust said optical wedge in spaced relationship to said collimating means to thereby vary the point of incidence of said collimated light beams on said multiple planar surface to in turn vary the pitch of the parallel collimated light beams among each other.

4. An apparatus for producing parallel light beams with variable pitch from, multiple non-parallel light beams as recited in claim 3 wherein said means to adjust said optical wedge, comprises:
    a frame,
    rails mounted on said frame,
    means for slidably mounting said optical wedge on said rails,
    means for positioning said collimating means, and non-parallel light beam producing and emitting means on said frame in axial alignment with the slidable movement of said means for slidably mounting said optical wedge, and
    means for slidably moving said optical wedge mounting means.

5. An apparatus for producing parallel multiple light beams with variable pitch from multiple non-parallel light beams as recited in claim 4, wherein said means for slidably moving said optical wedge mounting means is a stepper motor.

6. An apparatus for producing parallel multiple light beams with variable pitch, from multiple non-parallel light beams as recited in claim 4 further comprising means for fixing said optical wedge mounting means at fixed positions.

7. An apparatus for producing parallel multiple light beams with variable pitch from multiple non-parallel light beams as recited in claim 6, wherein said means for fixing said optical wedge at fixed positions further comprises recesses in said rails and spring biased detents mounted on said optical wedge mounting means for engaging said recesses in said rails.

8. An apparatus for producing parallel light beams with variable pitch from multiple non-parallel light beams, as recited in claim 3, wherein said means to adjust said optical wedge in spaced relationship to said collimating means to vary the pitch of the parallel light beams, further comprises means to fix said collimating and light producing and emitting means in relationship to one another and means to move said fixed collimating and light producing means and emitting means in relationship to said optical wedge.

9. An optical wedge for directing non-parallel beams of light into parallel beams, comprising:
    a back planar surface having multiple planar surfaces, a first planar surface in the optical pathway of a first beam of light of said non-parallel beams of light directing said first beam of light onto said back planar surface, a second planar surface set at an angle to said first planar surface, said second planar surface directing a second beam of non-parallel beams of light, onto said back planar surface at an angle of incidence to redirect said second beam of light into parallel alignment with said first beam of light.

10. An apparatus for producing parallel light beams on a surface from multiple light points, comprising:

a source for generating and emitting non-parallel light beams;

means for collimating said non-parallel emitted light beams; and an optical wedge for directing said collimated non-parallel light beams into parallel alignment and thence onto a surface;

said optical wedge comprising:

a back planar surface having multiple surfaces;

a first planar surface in the optical pathway of a first beam of light of said non-parallel beams of light directing said first beam of light onto said back planar surface; and a second planar surface set at an angle to said first planar surface, said second planar surface directing a second beam of non-parallel beams of light, onto said back planar surface at an angle of incidence to redirect said second beam of light into parallel alignment with said first beam of light.

11. An optical wedge for directing non-parallel beams of light into parallel beams, having multiple non-parallel planar surfaces, comprising:

a first planar surface in the optical pathway of the non-parallel beams of light, for directing said non-parallel beams of light, said first planar redirecting light beams striking it at an angle other than 90°, a second planar surface for receiving and directing light beams passing through said optical wedge in an optical pathway normal to said first planar surface, and a third planar surface for receiving and redirecting the light beam directed to it by said first planar surface, into parallel alignment with the light beams received and directed by said second planar surface.

* * * * *